US006677422B2

(12) United States Patent
Coca et al.

(10) Patent No.: US 6,677,422 B2
(45) Date of Patent: Jan. 13, 2004

(54) METHOD OF MAKING ALTERNATING COPOLYMERS OF ISOBUTYLENE TYPE MONOMERS

(75) Inventors: Simion Coca, Pittsburgh, PA (US); Edward R. Coleridge, Lower Burrell, PA (US); Gregory J. McCollum, Gibsonia, PA (US); James B. O'Dwyer, Valencia, PA (US); James E. Poole, Gibsonia, PA (US); Victoria A. Trettel, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 136 days.

(21) Appl. No.: 10/077,559

(22) Filed: Feb. 15, 2002

(65) Prior Publication Data

US 2003/0171515 A1 Sep. 11, 2003

(51) Int. Cl.[7] ................................................ C08F 10/00
(52) U.S. Cl. ................. 526/348.7; 526/264; 526/303.1; 526/317.1; 526/320; 526/329; 526/332; 526/347; 526/348
(58) Field of Search ................. 526/264, 303.1, 526/317.1, 320, 329, 332, 347, 348, 348.7

(56) References Cited

U.S. PATENT DOCUMENTS

| | | | |
|---|---|---|---|
| 2,378,629 A | 6/1945 | Hanford | 526/204 |
| 2,411,599 A | 11/1946 | Sparks et al. | 522/60 |
| 2,531,196 A | 11/1950 | Brubaker et al. | 526/225 |
| 3,856,685 A | * 12/1974 | Mori et al. | 252/56 R |
| 3,919,180 A | * 11/1975 | Furukawa et al. | 260/80.7 |
| 3,947,338 A | 3/1976 | Jerabek et al. | 204/181 |
| 3,957,732 A | * 5/1976 | Hirooka et al. | 526/90 |
| 3,984,299 A | 10/1976 | Jerabek | 204/181 |
| 4,139,480 A | * 2/1979 | Gardiner et al. | 252/51.5 A |
| 4,147,679 A | 4/1979 | Scriven et al. | 260/29.2 TN |
| 4,147,688 A | 4/1979 | Makhlouf et al. | 260/33.6 EP |
| 4,220,679 A | 9/1980 | Backhouse | 427/401 |
| 4,403,003 A | 9/1983 | Backhouse | 427/407.1 |
| 4,889,890 A | 12/1989 | Kerr et al. | 525/113 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,356,973 A | 10/1994 | Taljan et al. | 524/314 |
| 5,407,707 A | 4/1995 | Simeone et al. | 427/410 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,976,701 A | 11/1999 | Barancyk et al. | 428/423.1 |
| 5,989,642 A | 11/1999 | Singer et al. | 427/407.1 |
| 6,111,001 A | 8/2000 | Barancyk et al. | 524/211 |
| 6,114,489 A | 9/2000 | Vicari et al. | 528/84 |
| 6,281,272 B1 | 8/2001 | Baldy et al. | 523/501 |

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309–319, 1999.

Odian, "Chain Copolymerization," *Principles of Polymerization*, Third Edition, John Wiley & Sons, Inc., pp. 452–491, 1991.

Cowie, Alternating Copolymers, Plenum Press, pp. 1–137, 1985.

Rzaev et al., "Complex–Radical Copolymerization of 2,4, 4–trimethylpentene–1 with Maleic Anhydride," *Eur. Polym. J.*, vol. 34, No. 7, pp. 981–985, 1998.

Mashita et al., "Alternating Copolymerization of Isobutylene and Acrylic Ester with Alkylboron Halide," *Polymer*, vol. 36, No. 15, pp. 2973–2982, 1995.

Mashita et al., "Alternating Copolymers of Isobutylene and Acrylic Ester by Complexed Copolymerization," *Polymer*, Vol 36, No. 15, pp. 2983–2988, 1995.

Kuntz et al., "Poly[2, 2–Dimethyl–4–(methoxylcarbonyl)butylene]: Synthesis with an Ethylaluminum Sesquichloride–Peroxide Initiator and NMR Characterization," *J. of Polymer Science: Polymer Chemistry Edition*, vol. 16, pp. 1747–1753, 1978.

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM D–1200—94, "Standard Test Method for Viscosity by Ford Viscosity Cup," *Amer. Soc. Test. Mat.*, pp. 103–105, 1994.

ASTM D–2369—92, "Standard Test Method for Volatile Content of Coatings," *Amer. Soc. Test. Mat.*, pp. 46–48, 1992.

(List continued on next page.)

*Primary Examiner*—Helen L. Pezzuto
(74) *Attorney, Agent, or Firm*—William J. Uhl

(57) ABSTRACT

A method of making a copolymer composition containing a copolymer, which includes the steps of (a) providing a donor monomer composition that includes an isobutylene type monomer; (b) mixing the donor monomer composition with an ethylenically unsaturated monomer composition that includes one or more ethylenically unsaturated acceptor monomers, and is substantially free of maleate type monomers and fumarate type monomers, and (c) polymerizing the mixture resulting from step (b) in the presence of a free radical polymerization initiator. The polymerization is carried out in the substantial absence of Lewis acids and/or transition metals. The isobutylene type monomer is present at a molar excess of at least 10 mol % based on the molar concentration of monomers in the ethylenically unsaturated monomer composition. The ethylenically unsaturated acceptor monomers are present in an amount of at least 15 mol % of the total monomer composition.

48 Claims, No Drawings

OTHER PUBLICATIONS

ASTM D-3359—97, "Standard Test Methods for Measuring Adhesion by Tape Test," *Amer. Soc. Test. Mat.,* pp. 1–7, 1998.

ASTM D-4370—84, "Standard Test Methods for Acid and Base Milliequivalent Content of Electrocoat Bath," *Amer. Soc. Test. Mat.,* pp. 780–782, 1984.

"Reference Method 24: Determination of Volatile Matter Content, Water Content, Density, Volume Solids, and Weight Solids of Surface Coatings," *Federal Register,* EPA Reference Methods 24 and 24 A, vol. 57, No. 133, pp. 125–127, 1992.

* cited by examiner

METHOD OF MAKING ALTERNATING COPOLYMERS OF ISOBUTYLENE TYPE MONOMERS

FIELD OF THE INVENTION

The present invention generally relates to a method of making copolymers of vinyl monomers. More specifically, the present invention is directed to a method of making copolymers containing isobutylene type monomers.

BACKGROUND OF THE INVENTION

It is often observed that monomers that do not readily homopolymerize are able to undergo rapid copolymerization reactions with each other. The most typical situation occurs when a strong electron donating monomer is mixed with a strong electron accepting monomer from which a regular alternating copolymer results after free radical initiation. Maleic anhydride is a widely used example of a strong electron accepting monomer. Styrene and vinyl ethers are typical examples of electron donating monomer. Systems, such as maleic anhydride—styrene, are known to form charge transfer complexes, which tends to place the monomers in alternating sequence prior to initiation. The application of the free radical initiator "ties" the ordered monomers together to form an alternating copolymer (Cowie, *Alternating Copolymers*, Plenum, N.Y. (1985)).

U.S. Pat. No. 2,378,629 to Hanford and U.S. Pat. No. 4,151,336 to Sackmann et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester, poor incorporation of the electron donating monomer results. For example, free radical copolymerization of isobutylene (IB) and acrylic monomers has resulted in copolymers that contain at most 20–30% of IB and have low molecular weights because of degradative chain transfer of IB. Examples of such copolymerizations of IB are disclosed by U.S. Pat. No. 2,411,599 to Sparks et al. and U.S. Pat. No. 2,531,196 to Brubaker et al.

The ability to make copolymers of acrylic monomers and IB type monomers is desired in the art. For example, many patents express the potential for using IB-containing polymers in coating compositions. For example, U.S. Pat. No. 6,114,489 to Vicari et al. discloses a coating composition that includes a functional acrylic resin binder; a co-reactant capable of reacting with the functionality of the acrylic binder; a degasser; and a hyperbranched polyester flow and leveling agent. IB is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is a made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that few examples of isobutylene-type monomer-containing copolymers are found is due to the generally non-reactive nature of isobutylene with acrylic and methacrylic monomers. Reactivity ratios for monomers can be calculated using the Alfrey—Price Q-e values (Robert Z. Greenley, Polymer Handbook, Fourth Edition, Brandrup, Immergut and Gulke, editors, Wiley & Sons, New York, N.Y., pp. 309–319 (1999)). The calculations may be carried out using the formulas I and II:

$$r_1=(Q_1/Q_2)\exp\{-e_1(e_1-e_2)\} \qquad \text{I}$$

$$r_2=(Q_2/Q_1)\exp\{-e_2(e_2-e_1)\} \qquad \text{II}$$

where $r_1$ and $r_2$ are the respective reactivity ratios of monomers 1 and 2, and $Q_1$ and $Q_2$ and $e_1$ and $e_2$ are the respective reactivity and polarity values for the respective monomers (Odian, *Principals of Polymerization*, $3^{rd}$ Ed., Wiley-Interscience, New York, N.Y., Chapter 6, pp. 452–467 and 489–491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that few examples can be found of coating compositions that include isobutylene-type monomer-containing copolymers, because the monomers do not tend to copolymerize.

A few examples of acrylic ester or acrylonitrile copolymers made by copolymerizing with monomers such as propylene, isobutylene, and styrene, have been accomplished in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al., *J. Polym. Sci. Polym. Chem.*, 11, 1281 (1973)). The metal halides vary the reactivity of the monomers by complexing with them. The electron donor monomer—electron acceptor monomer—metal halide complex leads to alternating copolymers (Mashita et al., *Polymer*, Vol. 36, No. 15, pp. 2973–2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et al., *J. Polym. Sci. Polym. Chem.*, 16, 1747 (1978)) or high isotacticity in the presence of $EtAlCl_2$ (10 molar % relative to MA). (Florjanczyk et al., *Makromol. Chem.*, 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al., *Polymer*, 36, 2983 (1995)).

U.S. Pat. No. 5,807,937 to Matyjaszewski et al. discloses a method of making alternating copolymers of isobutylene and methyl acrylate using atom transfer radical polymerization (ATRP) processes. The method requires the use of a suitable ATRP initiator, such as 1-phenylethyl bromide, and suitable transition metal salts, such as CuBr, with a ligand, such as 2,2'-bipyridyl, to perform the complex redox initiation and propagation steps of the polymerization process.

Copolymers containing relatively high amounts (≧30 mol %) of IB and acrylic esters have only been attained by free radical polymerization when Lewis acids or ATRP initiation systems have been employed. The polymer that results from such processes requires expensive and time consuming clean-up to remove the transition metal salt and/or Lewis acid residues in order to make the polymer commercially useful.

Copolymer compositions that contain Lewis acids and/or transition metals intermingled with the copolymer can have a number of drawbacks when used commercially. First, some Lewis acids and transition metals are toxic and have adverse environmental effects if they are leached from the copolymer and enter the environment. In coating applications, the Lewis acids and transition metals may lead to poor stability when exposed to UV light or simply cause the coating to discolor. In other applications, the Lewis acids and transition metals may react with other ingredients in a formulation resulting in undesired properties.

Therefore, there is a clear and present need for a method for making copolymers containing isobutylene type monomers that does not rely on Lewis acids and transition metals to obtain an alternating copolymer.

SUMMARY OF THE INVENTION

The present invention is directed to a method of making a copolymer composition containing a copolymer having alternating donor-acceptor segments. The copolymerization method includes the steps of:

(a) providing a donor monomer composition that includes one or more monomers having structure (I):

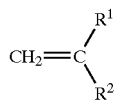

(I)

where $R^1$ is linear or branched $C_1$ to $C_4$ alkyl and $R^2$ is selected from the group consisting of methyl, linear, cyclic or branched $C_1$ to $C_{20}$ alkyl, alkenyl, aryl, alkaryl and aralkyl;

(b) mixing the donor monomer composition with an ethylenically unsaturated monomer composition that includes one or more ethylenically unsaturated acceptor monomers, forming a total monomer composition that is substantially free of maleate type monomers and fumarate type monomers; and (c) polymerizing the mixture resulting from step (b) in the presence of a free radical polymerization initiator. The polymerization is carried out in the substantial absence of Lewis acids and/or transition metals. The monomer of structure (I) is present at a molar excess based on the molar concentration of monomers in the ethylenically unsaturated monomer composition. The ethylenically unsaturated acceptor monomers are present in an amount of at least 15 mol % of the total monomer composition.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein the term "copolymer composition" is meant to include a synthesized copolymer as well as residues from initiators, catalysts and other elements attendant to the synthesis of the copolymer, but not covalently incorporated thereto. Such residues and other elements considered as part of the copolymer composition are typically mixed or co-mingled with the copolymer such they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable ethylenically unsaturated group that has relatively high electron density in the ethylenically double bond, and the term acceptor monomer refers to monomers that have a polymerizable ethylenically unsaturated group that has relatively low electron density in the ethylenic double bond. This concept has been quantified to an extent by the Alfrey-Price Q-e scheme (Greenley, *Polymer Handbook,* Fourth Edition, Brandrup, Immergut and Gulke, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term strong donor monomer is meant to include those monomers with an e value of less than −1.5, and the term "mild donor monomer" is meant to include those monomers with an e value of less than 0.5 to those with an e value of −1.5.

The present invention is directed to a method of making a copolymer composition containing alternating donor-acceptor segments. The method includes a first step of providing a donor monomer composition that includes an isobutylene type monomer generally described by structure (I):

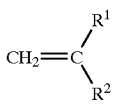

where $R^1$ is linear or branched $C_1$ to $C_4$ alkyl and $R^2$ is selected from the group consisting of methyl, linear, cyclic or branched $C_1$ to $C_{20}$ alkyl, alkenyl, aryl, alkaryl and aralkyl. In a presently preferred embodiment of the invention, the isobutylene type monomers are isobutylene, diisobutylene, dipentene, isoprenol and mixtures thereof.

The group $R^2$ of the donor monomer of structure (I) may include one or more functional groups selected from the group consisting of hydroxy, epoxy, carboxylic acid, ether, carbamate and amide.

In addition to isobutylene type donor monomers, other suitable donor monomers may be included in the present method. Suitable other donor monomers include, but are not limited to, ethylene, butene, styrene, substituted styrenes, methyl styrene, substituted methyl styrenes, vinyl ethers, vinyl esters, vinyl pyridines, divinyl benzene, vinyl naphthalene and divinyl naphthalene. Vinyl esters include vinyl esters of carboxylic acids, which include, but are not limited to, vinyl acetate, vinyl butyrate, vinyl 3,4-dimethoxybenzoate and vinyl benzoate.

Of note in the present method is that the resulting copolymerization method incorporates a substantial portion of alternating residues of a mild donor monomer and a mild acceptor monomer. A non-limiting list of published e values for monomers that may be included as mild donor monomers in the present invention are shown in Table 2.

TABLE 2

Alfrey-Price e values for Selected Donor Monomers

| Monomer | e value |
| --- | --- |
| Isobutylene | −1.20[1] |
| Diisobutylene | 0.49[2] |
| Vinyl isobutyl ether | −1.27[1] |
| Vinyl formate | −1.19[1] |
| Vinyl ether | −1.16[1] |
| Vinyl acetate | −0.88[1] |
| A-methyl styrene | −0.81[1] |
| Styrene | −0.80[1] |
| 2-vinyl pyridine | −0.41[1] |

[1]Polymer Handbook, Fourth Edition (1999)
[2]Rzaev et al., Eur. Polym. J., Vol. 24, No. 7, pp. 981–985 (1998)

In a second step of the present method, the donor monomer composition is mixed with an ethylenically unsaturated monomer composition to form a total monomer composition. The ethylenically unsaturated monomer composition includes one or more ethylenically unsaturated acceptor monomers. The ethylenically unsaturated monomer composition is substantially free of maleate type monomers and fumarate type monomers.

The ethylenically unsaturated acceptor monomers comprise one or more monomers described by the structure (II):

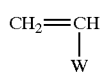

where W is selected from the group consisting of —CN and —X, wherein X is a halide. When W is a —C(=O)OR group, structure (II) represents an acrylic monomer. The present method is particularly directed to copolymers having alternating sequences of monomers of structure (I) and acrylic acceptor monomers.

A non-limiting list of published e values for monomers that may be included as acceptor monomers in the present invention are shown in Table 3.

TABLE 3

Alfrey-Price e values for Selected Acceptor Monomers

| Monomer | e value |
| --- | --- |
| Acrylic acid | 0.88[1] |
| Acrylamide | 0.54[1] |
| Acrylonitrile | 1.23[1] |
| Methyl acrylate | 0.64[1] |
| Ethyl acrylate | 0.55[1] |
| Butyl acrylate | 0.85[1] |
| Benzyl acrylate | 1.13[1] |
| Glycidyl acrylate | 1.28[1] |
| Acrylonitrile | 1.23[1] |
| Methacrylonitrile | 0.68[1] |
| Vinyl fluoride | 0.72[1] |
| Crotonic acid | 0.89[1] |
| Acrolein | 1.31[1] |

[1]Polymer Handbook, Fourth Edition (1999)

When the ethylenically unsaturated acceptor monomer is an acrylic acceptor monomer, it is one or more monomers described by structure (III):

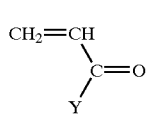

where Y is selected from the group consisting of —NR$^3$$_2$, —O—R$^5$—O—C(=O)—NR$^3$$_2$, and —OR$^4$, R$^3$ is selected from the group consisting of H, linear or branched $C_1$ to $C_{20}$ alkyl and linear or branched $C_1$ to $C_{20}$ alkylol, R$^4$ is selected from the group consisting of H, poly(ethylene oxide), poly (propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, and Rs is a divalent linear or branched $C_1$ to $C_{20}$ alkyl linking group.

Specific suitable acceptor monomers include, but are not limited to, hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris(trimethylsiloxy silane), acryloxyalkyl trimethylsiloxy terminated polyethylene oxide, chlorotrifluoro ethylene, glycidyl acrylate, 2-ethylhexyl acrylate and n-butoxy methyl acrylamide.

In an embodiment of the present method, the group represented by Y includes at least one suitable functional group. Suitable functional groups for Y include, but are not limited to, epoxy, carboxylic acid, hydroxy, amide, ether, ester, isocyanate, amine, thioether and sulfide.

In an embodiment of the present method, the monomer of structure (I) is present in the total monomer composition at a molar excess based on the amount of acrylic acceptor monomer. Any amount of excess monomer of structure (I)

may be used in the present invention in order to encourage the formation of the desired alternating copolymer architecture. The excess amount of monomer of structure (I) may be at least 10 mol %, in some cases up to 25 mol %, typically up to 50 mol % and in some cases up to 100 mol % based on the amount of acrylic acceptor monomer. When the molar excess of monomer of structure (I) is too high, the method may not be economical on a commercial scale.

In a further embodiment of the present method, the acrylic acceptor monomer of structure (III) is present in an amount of at least 15 mol %, in some cases 17.5 mol %, typically at least 20 mol % and in some cases 25 mol % of the total monomer composition. The acrylic acceptor monomer may further be present in an amount up to 50 mol %, in some cases up to 47.5 mol %, typically up to 45 mol % and in some cases up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The use of other acceptor monomers is optional in the present method. Suitable other acceptor monomers that may be used in the present invention include, but are not limited to, acrylonitrile, methacrylonitrile, vinyl halides, crotonic acid, vinyl alkyl sulfonates and acrolein. When other mild acceptor monomers are present, they are present at a level of at least 0.01 mol % of the total monomer composition, often at least 0.1 mol %, typically at least 1 mol % and in some cases at least 2 mol % of the total monomer composition. The other acceptor monomers may be present at up to 35 mol %, in some cases up to 25 mol %, typically up to 15 mol % and in some cases up to 10 mol % of the total monomer composition. The level of other acceptor monomers used herein is determined by the properties that are to be incorporated into the copolymer. The other acceptor monomers may be present in any range of values inclusive of those stated above.

The ethylenically unsaturated monomer composition of the present method may include other ethylenically unsaturated monomers. The other monomers may include ethylenically unsaturated monomers of general structure (V):

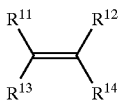
(V)

wherein $R^{11}$, $R^{12}$ and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^{13}$ is selected from the group consisting of H, $C_1$–$C_6$ alkyl, $COOR^{15}$ wherein $R^{15}$ is selected from the group consisting of H, an alkali metal, a $C_1$ to $C_6$ alkyl group, glycidyl and aryl.

As used herein and in the claims, "other ethylenically unsaturated radically polymerizable monomer" and like terms are meant to include vinyl monomers, allylic monomers, methacrylic monomers, olefins and other ethylenically unsaturated monomers that are radically polymerizable and not classified as donor monomers or acceptor monomers.

Examples of classes of vinyl monomers from which the other ethylenically unsaturated radically polymerizable monomers may be selected include, but are not limited to, methacrylic monomers and allylic monomers. When the other ethylenically unsaturated radically polymerizable monomers are methacrylic monomers, they may be at least one of alkyl methacrylate having from 1 to 20 carbon atoms in the alkyl group. Specific examples of alkyl methacrylates having from 1 to 20 carbon atoms in the alkyl group include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate as well as functional methacrylates, such as hydroxyalkyl methacrylates, epoxy functional methacrylates and carboxylic acid functional methacrylates.

The other ethylenically unsaturated radically polymerizable monomers may also be selected from monomers having more than one methacrylate groups, for example, methacrylic anhydride and diethyleneglycol bis(methacrylate).

As used herein and in the claims, by "allylic monomer(s)" what is meant is monomers containing substituted and/or unsubstituted allylic functionality, i.e., one or more radicals represented by the following general structure (V),

where $R^{10}$ is hydrogen, halogen or a $C_1$ to $C_4$ alkyl group. Most commonly, $R^{10}$ is hydrogen or methyl and consequently general structure (VIII) represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.**

When other ethylenically unsaturated monomers are present, they are present at a level of at least 0.01 mol % of the total monomer composition, often at least 0.1 mol %, typically at least 1 mol % and in some cases at least 2 mol % of the total monomer composition. The other monomers may be present at up to 35 mol %, in some cases up to 25 mol %, typically up to 15 mol % and in some cases up to 10 mol % of the total monomer composition. The level of other monomers used herein is determined by the properties that are to be incorporated into the copolymer. The other ethylenically unsaturated monomers may be present in the total monomer composition in any range of values inclusive of those stated above.

The mixture of the total monomer composition is polymerized in the presence of a free radical polymerization initiator in the substantial absence of Lewis acids and transition metals. Any suitable free radical polymerization initiator may be used in the present invention. Suitable free radical initiators are typically thermal free radical initiators. Suitable thermal free radical initiators include, but are not limited to, peroxide compounds, azo compounds and persulfate compounds.

Examples of suitable thermal free radical initiator peroxide compounds include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

Examples of suitable thermal free radical initiator azo compounds include, but are not limited to, 4-4'-azobis(4- cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis (2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,21-azobis(2-amidinopropane) dihydrochloride, 2,2'-azobis(N,N'-dimethyleneisobutyramidine) dihydrochloride, 2-(carbamoylazo)-isobutyronitrile and mixtures thereof.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes and in some cases at least 1 hour. The ethylenically unsaturated monomer composition and the free radical polymerization initiator may further be added to the donor monomer composition over a period of up to 24 hours, in some cases up to 18 hours, typically up to 12 hours and in some cases up to 8 hours. The time for adding the ethylenically unsaturated monomer must be sufficient to maintain a suitable excess of donor monomer of structure (I) over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing or during addition and mixing, polymerization of the monomers takes place at a suitable temperature. The present polymerization method can be run at any suitable temperature. Suitable temperatures for the present method may be ambient, at least 50° C., in many cases at least 60° C., typically at least 75° C. and in some cases at least 100° C. Suitable temperatures for the present method may further be described as being up to 300° C., in many cases up to 275° C., typically up to 250° C. and in some cases up to 225° C. The temperature is typically high enough to encourage good reactivity from the monomers and initiators employed. However, the volatility of the monomers and corresponding partial pressures create a practical upper limit on temperature determined by the pressure rating of a reaction vessel employed. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi and in some cases at least 20 psi. Suitable pressures for the present method may further be described as being up to 200 psi, in many cases up to 175 psi, typically up to 150 psi and in some cases up to 125 psi. The pressure is typically high enough to maintain the monomers and initiators in a liquid phase. The pressures employed have a practical upper limit based on the pressure rating of the reaction vessel employed. The pressure during polymerization may vary in any range of values inclusive of those stated above.

When the polymerization is completed, a portion of the monomer of structure (I) will typically remain because it did not polymerize. The unreacted portion of the monomer of structure (I) is substantially removed from the resulting copolymer composition by evaporation. In an embodiment of the present invention, the removal of the unreacted portion of the monomer of structure (I) is facilitated by the application of a vacuum.

In an embodiment of the present method of making a copolymer composition containing alternating donor-acceptor segments, the method includes the steps of (a) providing a donor monomer composition that includes one or a combination of isobutylene, diisobutylene, dipentene and isoprenol; (b) mixing the donor monomer composition with an ethylenically unsaturated monomer composition to make a total monomer composition that is substantially free of maleate or fumarate type monomers and includes one or more acrylic acceptor monomers of structure (III) and (c) polymerizing the total monomer composition in the presence of a free radical polymerization initiator in the substantial absence of Lewis acids and transition metals.

The donor monomer composition is present at a molar excess of at least 10 mol % based on the molar concentration of acrylic acceptor monomer, and the acrylic acceptor monomer is present in an amount of at least 15 mol % of the total mols of the total monomer composition.

The method of the present invention provides a copolymer composition that includes a copolymer. The copolymer contains at least 30 mol %, in many cases at least 40 mol %, typically at least 50 mol %, in some cases at least 60 mol % and in other cases at least 75 mol % of monomer residues derived from alternating sequences of donor monomer—acceptor monomer pairs. The alternating monomer residue pairs can be described as:

-[DM-AM]- where DM represents a residue from a donor monomer and AM represents a residue from an acceptor monomer. The copolymer may be a 100% alternating copolymer of DM and AM. More particularly, at least 15 mol % of the copolymer includes a donor monomer of structure (I) and is substantially free of maleate and/or fumarate monomer residues. When maleate and/or fumarate monomer residues are present, they can result in multifunctional monomers with too many functional groups in the copolymer. This can create problems, for example, in coatings where a thermosetting composition may have a short shelf life due to the overly functional nature of the copolymer.

Further, a copolymer composition that results from the present method is substantially free of transition metals and Lewis acids, which as noted above, have been used in the prior art to make alternating copolymers of mild donor monomers and mild acceptor monomers. The present invention does not utilize transition metals or Lewis acid adjuncts in preparing the present copolymer composition; therefore, they need not be removed after polymerization, and the resulting copolymer compositions will not suffer the drawbacks inherent in those that contain transition metals or Lewis acids.

The copolymer that results from the present method has a molecular weight of at least 250, in many cases at least 500, typically at least 1,000 and in some cases at least 2,000. The present copolymer may have a molecular weight of up to 1,000,000, in many cases up to 500,000, typically up to 100,000 and in some cases up to 50,000. Certain applications will require that the molecular weight of the present copolymer not exceed 25,000, in some cases not exceed 20,000 and in certain instances not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the copolymer produced using the present method is not always critical. The polydispersity index of the copolymer is usually less than 4, in many cases less than 3.5, typically less than 3.0 and in some cases less than 2.5. As used herein, and in the claims, "polydispersity index" is determined from the following equation: (weight average molecular weight (Mw)/number average molecular weight (Mn)). A monodosperse polymer has a PDI of 1.0. Further, as used herein, Mn and Mw are determined from gel permeation chromatography using polystyrene standards.

In an embodiment of the present invention, the copolymer produced by the present method may include alternating sequences of donor monomer—acceptor monomer residue pairs that have the alternating structure (VI):

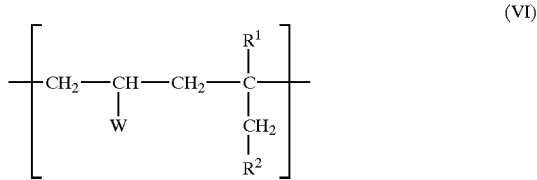

where $R^1$, $R^2$ and W are defined as above. A particularly preferred embodiment is one wherein the monomer residues containing the group W are derived from one or more acrylic monomers, and the monomer residues containing the groups $R^1$ and $R^2$ are derived from one or a combination of diisobutylene, isobutylene, dipentene and isoprenol. The copolymer compositions of the present invention may also include other polymerizable ethylenically unsaturated monomers.

The copolymer composition resulting from the present method may have all of the incorporated monomer residues in an alternating architecture. A non-limiting example of a copolymer segment having 100% alternating architecture of diisobutylene (DIIB) and an acrylic monomer (Ac) is shown by structure (VII):

-Ac-DIIB-Ac-DIIB-Ac-DIIB-Ac-DIIB-Ac-DIIB-Ac-DIIB-Ac- (VII)

However, in most instances, the copolymer resulting from the present method will contain alternating segments and random segments as shown by structure (VIII), a copolymer of DIIB, Ac and other monomers, M:

(VII)

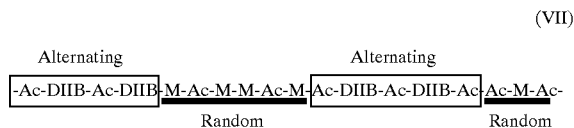

Structure (VIII) shows an embodiment of the present invention where the copolymer may include alternating segments, as shown in the boxes, and random segments, as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure (VIII).

The copolymer that results from the present method may be utilized as a starting material for the preparation of other polymers by using functional group transformations by methods known in the art. Functional groups that can be introduced by these methods are epoxy, carboxylic acid, hydroxy, amide, oxazoline, acetoacetate, isocyanate, carbamate, amine, amine salt, quaternary ammonium, thioether, sulfide, sulfonium and phosphate.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively one can prepare a carboxyl-functional copolymer by hydrolysis as described above, treat the carboxyl-functional copolymer with epichlorohydrin then alkali to produce the epoxy functional copolymer. These transformations can also be carried out exhaustively or in part. The resulting epoxy-functional copolymer can be further reacted with the appropriate active hydrogen containing reagents to form alcohols, amines or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy one can produce a hydroxyl functional polymer. Suitable epoxies include, but are not limited to, ethylene oxide, propylene oxide, butylene oxide and glycidyl neodecanoate.

The above-described hydroxyl functional copolymers can be further reacted to form other copolymers. For example, a copolymer containing hydroxyethyl groups can be treated with a carbamylating agent, such as methyl carbamate, to produce the corresponding carbamate functional copolymer. With diketene or t-butyl acetoacetate the hydroxyl groups can also be converted to acetoacetate esters.

Isocyanate functional copolymers can also be produced. Copolymers of the present method, which contain 2 or more hydroxyl groups, can be treated with a diisocyanate such as isophoronediisocyanate to produce isocyanate-functional polymers. Primary amine functional copolymers, described above, can be phosgenated to produce isocyanate functionality.

Ionic functionality can be incorporated into the copolymer of the present method by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen containing amine followed by protonation with acid. Quaternary amine functional groups or ternary sulfonium groups can be introduced into the copolymer by treating an epoxy functional copolymer of the present method with a tertiary amine or sulfide, respectively, in the presence of a protic acid.

The present invention is more particularly described in the following examples, which are intended to be illustrative only, since numerous modifications and variations therein will be apparent to those skilled in the art. Unless otherwise specified, all parts and percentages are by weight.

EXAMPLE 1-A

Synthesis of alternating copolymer diisobutylene/methyl methacrylate-alt-hydroxypropyl acrylate/butyl acrylate. The ingredients in Table 4 were used for the polymerization.

TABLE 4

|  | Ingredients | Parts by weight (grams) |
| --- | --- | --- |
| Charge 1 | Diisobutylene | 337.00 |
| Charge 2 | t-Amylperoxy(2-ethyl hexanoate) | 33.70 |
| Charge 3 | Methyl Methacrylate | 337.00 |
|  | Hydroxypropyl Acrylate | 112.30 |
|  | Butyl Acrylate | 337.00 |

Charge 1 was added to a 4-liter stirred stainless steel pressure reactor. The reactor was then pressurized with nitrogen providing a 5 psig pad on the reactor. The agitation on the reactor was 500 rpm and the reactor temperature was adjusted to 125° C. Charge 2 was added to the reactor at an addition rate of 9.62 grams/hour over 3.5 hours. Fifteen minutes after Charge 2 was started, Charge 3 was added to the reactor at an addition rate of 262.10 grams/hour over 3 hours. During the monomer addition the temperature was maintained at 125° C. at 40 PSI. After the addition of Charge 2 and Charge 3 was complete, the reaction mixture was held for 2 hours. The reactor was then cooled to 25° C., and vented. Gas chromatography (GC) analysis of the reaction mixture showed that all of the (meth)acrylate had reacted. The reaction mixture was transferred to a 3L flask, and was vacuum-stripped at 130° C. The reaction mixture was cool to 80° C. and 200 grams of n-butyl acetate was added. The solids of the resulting polymer solution was determined to be 78.3% determined at 110° C. for one hour. The copolymer had a number average molecular weight ($M_n$) of 1,200 and polydispersity ($M_w/M_n$) of 2.0 (determined by gel permeation chromatography using polystyrene as a standard). A $^{13}$C NMR spectrum was consistent with a molar copolymer composition of 21.9% diisobutylene, 11.1% hydroxypropyl acrylate, 33.5% methyl methacrylate, and 33.5% butyl acrylate.

EXAMPLE 1-B

Synthesis of alternating copolymer diisobutylene-alt-hydroxypropyl acrylate/butyl acrylate. The ingredients in Table 5 were used for the polymerization in isopropanol solvent.

TABLE 5

|  | Ingredients | Parts by weight (grams) |
| --- | --- | --- |
| Charge 1 | Diisobutylene | 500 |
|  | Isopropanol | 400 |
| Charge 2 | Di-t-amyl Peroxide | 20 |
|  | Isopropanol | 100 |
| Charge 3 | Hydroxypropyl Acrylate | 250 |
|  | Butyl Acrylate | 250 |

Charge 1 was added to a 4-liter stirred stainless steel pressure reactor. The reactor was pressurized with nitrogen to provide a 5 psig pad on the reactor. The agitation on the reactor was set at 500 rpm and the reactor temperature was adjusted to 150° C. Charge 2 was added to the reactor at an addition rate of 48 grams/hour over 2.5 hours. After 15 minutes Charge 3 was added to reactor at an addition rate 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2L flask, and was vacuum-stripped at 130° C. The solids of the resulting polymer solution was determined to be 100% determined at 110° C. for one hour. The copolymer had $M_n$=850 and $M_w/M_n$=1.7. The $^{13}$C NMR spectrum was consistent with a molar copolymer composition of 24.7% diisobutylene, 37.65% hydroxypropyl acrylate, and 37.65% butyl acrylate.

EXAMPLE 1-C

Synthesis of alternating copolymer diisobutylene-alt-hydroxyethyl acrylate/butyl acrylate. The ingredients in Table 6 were used for the polymerization in isopropanol solvent.

TABLE 6

|  | Ingredients | Parts by weight (grams) |
| --- | --- | --- |
| Charge 1 | Diisobutylene | 500 |
|  | Isopropanol | 400 |
| Charge 2 | Di-t-amyl Peroxide | 20 |
|  | Isopropanol | 100 |
| Charge 3 | Hydroxyethyl Acrylate | 250 |
|  | Butyl Acrylate | 250 |

Charge 1 was added to a 4-liter stirred stainless steel pressure reactor. The reactor was then pressurized with nitrogen to provide a 5 psig pad on the reactor. The agitation on the reactor was set at 500 rpm and the reactor temperature was adjusted to 150° C. Charge 2 was added to the reactor at an addition rate of 48 grams/hour over 2.5 hours. After 15 minutes Charge 3 was added to reactor at an addition rate of 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2L flask, and was vacuum-stripped at 130° C. The solids of the resulting polymer was determined to be 100% determined at 110° C. for one hour. The copolymer had number average molecular weight, $M_n$=910 and polydispersity $M_w/M_n$=1.8 (determined by gel permeation chromatography using polystyrene as a standard). The $^{13}$C NMR spectrum was consistent with a molar copolymer composition of 25% Diisobutylene, 37.5% Hydroxyethyl acrylate, and 37.5% Butyl acrylate.

EXAMPLE 2-D

Synthesis of alternating copolymer diisobutylene-alt-hydroxypropyl acrylate/butyl acrylate/acrylic acid. The ingredients in Table 7 were used for the polymerization.

TABLE 7

| | Ingredients | Parts by weight (grams) |
|---|---|---|
| Charge 1 | Diisobutylene | 1120.00 |
| Charge 2 | Di-t-amyl Peroxide | 93.60 |
| Charge 3 | Acrylic acid | 144.00 |
| | Hydroxypropyl Acrylate | 720.00 |
| | Butyl acrylate | 1136.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 37.4 grams/hour over 2.5 hours. After 15 minutes Charge 3 was added to reactor at an addition rate of 1000 grams/hour over 2 hours. During the monomer addition the temperature was maintained at 150° C. at 100 PSI. After Charge 2 and charge 3 were in the reactor, the reaction mixture was held for 2 hours. The reactor was then cooled to 25° C., and vented. GC analysis of the reaction mixture show that all acrylates were reacted. The reaction mixture was transferred to a 5L flask, and was vacuum-stripped at 130° C. The solids of the resulting polymer was dissolved in 500 grams of butyl carbitol (Union Carbide) and the final solids of the solution was determined to be 80.73%, determined at 110° C. for one hour. The copolymer had $M_n$=2080 and $M_w/M_n$=2.7. The $^{13}$C NMR spectrum was consistent with a molar copolymer composition of 24% diisobutylene, 27.36% hydroxypropyl acrylate, 43.17% butyl acrylate, and 5.47% acrylic acid.

EXAMPLE 3-E

Synthesis of alternating copolymer diisobutylene-alt-hydroxyethyl acrylate/butyl acrylate. The ingredients in Table 8 were used for the polymerization.

TABLE 8

| | Ingredients | Parts by weight (grams) |
|---|---|---|
| Charge 1 | Diisobutylene | 1000.00 |
| Charge 2 | Di-t-amyl Peroxide | 85.80 |
| Charge 3 | Hydroxyethyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.5 grams/hour over 2.5 hours. After 15 minutes Charge 3 was added to reactor at the addition rate of 928.6 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of reaction mixture showed that all acrylates were reacted. The reaction mixture was transferred to a 5L flask, and was vacuum-stripped at 130° C. The final solids of the resulting polymer was determined to be 97.56% 110° C. for one hour. The copolymer had $M_n$=1760 and $M_w/M_n$=2.4. The $^{13}$C NMR spectrum was consistent with a molar copolymer composition of 24.43% diisobutylene, 29.06% hydroxyethyl acrylate, and 46.51% butyl acrylate.

EXAMPLE 3-F

Synthesis of alternating copolymer diisobutylene-alt-hydroxypropyl acrylate/butyl acrylate. The ingredients in Table 9 were used for the polymerization.

TABLE 9

| | Ingredients | Parts by weight (grams) |
|---|---|---|
| Charge 1 | Diisobutylene | 1359.20 |
| Charge 2 | Di-t-amyl Peroxide | 116.60 |
| Charge 3 | Hydroxypropyl Acrylate | 970.80 |
| | Butyl Acrylate | 1553.40 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 46.6 grams/hour over 2.5 hours. After 15 minutes Charge 3 was added to the reactor at an addition rate of 1262.7 grams/hour over 2 hours. During the monomer addition the temperature was maintained at 150° C. and 100 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5L flask, and was vacuum-stripped at 130° C. The final solids of the resulting polymer was determined to be 97.96% determined at 110° C. for one hour. The copolymer had $M_n$=1610 and $M_w/M_n$=2.2. The $^{13}$C NMR spectrum was consistent with a molar copolymer composition of 23.15% diisobutylene, 29.56% hydroxypropyl acrylate, and 47.29% butyl acrylate.

EXAMPLE 3-G

Synthesis of alternating copolymer isobutylene-alt-hydroxypropyl acrylate/butyl acrylate. The ingredients in Table 10 were used for the polymerization:

TABLE 10

| | Ingredients | Parts by weight (grams) |
|---|---|---|
| Charge 1 | Isobutylene | 1000.00 |
| Charge 2 | Di-t-amyl Peroxide | 85.80 |
| Charge 3 | Hydroxypropyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.3 grams/hour over 2.5 hours. After 15 minutes Charge 3 was added to reactor at an addition rate of 928.6 grams/hour over 2 hours. During the monomer addition the temperature was maintained at 150° C. at 250 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5L flask, and was vacuum-stripped at 130° C. The final solids of the resulting polymer was determined to be 89.97% (remainder toluene) at 110° C. for one hour. The copolymer had $M_n$=2760 and $M_w/M_n$=2.7. The $^{13}$C NMR spectrum was consistent with a molar copolymer composition of 35% isobutylene, 25% hydroxypropyl acrylate, and 40% butyl acrylate.

EXAMPLE 4-I

Synthesis of copolymer diisobutylene/hydroxypropyl acrylate/butyl methacrylate/styrene/acrylic acid/butyl acrylate. The ingredients in Table 11 were used for the polymerization:

TABLE 11

| | Ingredients | Parts by weight (grams) |
| --- | --- | --- |
| Charge 1 | Diisobutylene | 500.00 |
| | Isopropanol | 400.00 |
| Charge 2 | Di-t-amyl Peroxide | 30.00 |
| | Isopropanol | 100.00 |
| Charge 3 | Hydroxypropyl Acrylate | 450.00 |
| | Butyl Methacrylate | 200.00 |
| | Styrene | 100.00 |
| | Acrylic Acid | 30.00 |
| | Butyl Acrylate | 220.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 52 grams/hour over 2.5 hours. After 15 minutes Charge 3 was added to reactor at the addition rate 500 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 3L flask, and was vacuum-stripped at 130° C. The final solids of the resulting polymer was determined by adding 200 grams of butyl acetate to the polymer mixture. The solids were measured at 82.2% at 110° C. for one hour. The copolymer had $M_n$=1560 and $M_w/M_n$=2.2. The $^{13}$C NMR spectrum was consistent with a molar copolymer composition of 20.4% Diisobutylene, 36.3% Hydroxypropyl acrylate, 16.1% Butyl methacrylate, 8.1% Styrene, 2.4% Acrylic acid, and 17.6% Butyl acrylate.

EXAMPLE 4-J

Synthesis of copolymer diisobutylene/hydroxypropyl acrylate/butyl methacrylate/styrene/butyl acrylate. The ingredients in Table 12 were used for the polymerization:

TABLE 12

| | Ingredients | Parts by weight (grams) |
| --- | --- | --- |
| Charge 1 | Diisobutylene | 1000.00 |
| Charge 2 | Di-t-amyl Peroxide | 90.00 |
| Charge 3 | Hydroxypropyl Acrylate | 900.00 |
| | Butyl Methacrylate | 400.00 |
| | Styrene | 200.00 |
| | Butyl Acrylate | 500.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at the addition rate 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to 5L flask, and was vacuum-stripped at 125° C. The final solids of the resulting polymer was determined to be 98.63% at 110° C. for one hour. The copolymer had $M_n$=1960 and $M_w/M_n$=2.3. The $^{13}$C NMR spectrum was consistent with a molar copolymer composition of 17.67% diisobutylene, 37.1% hydroxypropyl acrylate, 16.36% butyl methacrylate, 8.25% styrene, and 20.62% butyl acrylate.

EXAMPLE 4-K

Synthesis of copolymer diisobutylene/hydroxypropyl acrylate/butyl methacrylate/styrene/hydroxyethyl methacrylate/butyl acrylate. The ingredients in Table 13 were used for the polymerization.

TABLE 13

| | Ingredients | Parts by weight (grams) |
| --- | --- | --- |
| Charge 1 | Diisobutylene | 1000.00 |
| Charge 2 | Di-t-amyl Peroxide | 90.00 |
| Charge 3 | Hydroxypropyl Acrylate | 450.00 |
| | Butyl Methacrylate | 400.00 |
| | Styrene | 200.00 |
| | Hydroxyethyl Methacrylate | 450.00 |
| | Butyl Acrylate | 500.00 |
| Charge 4 | Xylene | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at an addition rate of 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 5L flask, and was vacuum-stripped at 125° C. The final solids of the resulting polymer was determined by adding 250 grams of xylene to the polymer mixture. The solids were 87.60% determined at 110° C. for one hour. The copolymer had $M_n$=1930 and $M_w/M_n$=2.6. The $^{13}$C NMR spectrum was consistent with a molar copolymer composition of 15.6% diisobutylene, 18.99% hydroxypropyl acrylate, 16.88% butyl methacrylate, 8.44% styrene, 18.99% hydroxyethyl methacrylate and 21.10% butyl acrylate.

EXAMPLE 4-L

Synthesis of carbamate functional polymer from diisobutylene/hydroxypropyl acrylate/butyl methacrylate/styrene/butyl acrylate (DIB/HPA/BMA/Sty/BA) copolymer from example 4-J. A carbamate-functional copolymer was prepared from the ingredients in Table 14.

TABLE 14

| | Ingredients | Parts by weight (grams) |
|---|---|---|
| Charge 1 | Acrylic/Diisobutylene copolymer solution (Example 4-J) | 1067.30 |
| | Xylene | 85.60 |
| | Aromatic 100 (ExxonMobil) | 85.60 |
| | Methyl carbamate | 169.00 |
| | Butyl stannoic acid | 2.23 |
| | Triphenyl phosphite | 2.23 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, distillation head, thermocouple, and receiver flask) at atmospheric pressure. Distillate began to be collected at 145° C. The temperature of the reaction was gradually increased over a 6 hour period to 155° C. to maintain a steady rate of distillation. When distillation ceased and 64.5 ml of methanol had been collected, the reaction mixture was sampled and the hydroxy value found to be 46.5 at 85.88% solids. The contents of the reactor were then cooled.

EXAMPLE 4-M

Synthesis of carbamate functional polymer from diisobutylene/hydroxypropyl acrylate/butyl methacrylate/styrene/hyroxyethyl methacrylate/butyl acrylate (DIB/HPA/BMA/Sty/HEMA/BA) copolymer (example 4-K). A carbamate-functional copolymer was prepared from the ingredients in Table 15.

TABLE 15

| | Ingredients | Parts by weight (grams) |
|---|---|---|
| Charge 1 | Acrylic/Diisobutylene copolymer solution (Example 4-K) | 1172.90 |
| | Methyl carbamate | 169.00 |
| | Butyl stannoic acid | 2.40 |
| | Triphenyl phosphite | 2.40 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, still head, thermocouple, and receiver flask) at atmospheric pressure. Distillate began to be collected at 145° C. The temperature of the reaction was gradually increased over to 6 hours to 155° C. to maintain a steady rate of distillation. When distillation ceased and 65.6 ml methanol collected, the reaction mixture was sampled and the hydroxy value found to be 59.1 at 88.55% solids. The contents of the reactor were then cooled.

EXAMPLE 5-N

Synthesis of copolymer isobutylene/dimethylaminoethyl methacrylate-alt-hydroxyethyl acrylate/2-ethylhexyl acrylate. The ingredients in Table 16 were used for the polymerization.

TABLE 16

| | Ingredients | Parts by weight (grams) |
|---|---|---|
| Charge 1 | Isobutylene | 500.00 |
| Charge 2 | Di-t-amyl Peroxide | 75.00 |
| Charge 3 | Hydroxyethyl Acrylate | 750.00 |
| | 2-Ethyihexyl Acrylate | 1000.00 |
| | Dimethylaminoethyl methacrylate | 250.00 |
| Charge 4 | 2-butoxy ethanol | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 30.0 grams/hour over 2.5 hours. After 15 minutes charge 3 was added to reactor at an addition rate of 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 80° C., and vacuum-stripped for 30 minutes. Charge 4 was added over 15 minutes at 1000 grams/hour. The final solids of the resulting polymer was determined to be 86.49% at 110° C. for one hour. The copolymer had $M_n$=2900 and $M_w/M_n$=3.7. The $^{13}$C NMR spectrum was consistent with a molar copolymer composition of 20% isobutylene, 30% hydroxyethyl acrylate, 10% dimethylaminoethyl methacrylate and 40% 2-ethylhexyl acrylate.

EXAMPLE 5-N-D

Preparation of an aqueous amine salt dispersion of copolymer isobutylene/dimethylaminoethyl methacrylate-alt-hydroxyethyl acrylate/2-ethylhexyl acrylate. The ingredients in Table 17 were used to make the dispersion.

TABLE 17

| Ingredients | Parts by weight (grams) |
|---|---|
| Deionized water | 1103.4 |
| DMPA | 63.7 |
| Isobutylene/Dimethylaminoethyl methacrylate-alt-Hydroxyethyl acrylate/2-Ethylhexyl acrylate (Example 5-N) | 867.2 |
| Deionized water | 1220.5 |

The ingredients were added sequentially to a suitable vessel under mild agitation. The final solids were 24.9%.

EXAMPLE 5-O

Synthesis of copolymer isobutylene/dimethylaminoethyl methacrylate-alt-hydroxypropyl acrylate/2-ethylhexyl acrylate/ethyl acrylate. The ingredients in Table 18 were used for the polymerization.

TABLE 18

| Ingredients | Parts by weight (grams) |
| --- | --- |
| Charge 1 | Diisobutylene | 1000.00 |
| Charge 2 | Di-t-amyl Peroxide | 85.70 |
| Charge 3 | Hydroxypropyl Acrylate | 714.30 |
| | 2-Ethylhexyl Acrylate | 714.30 |
| | Dimethylaminoethyl methacrylate | 238.10 |
| | Ethyl Acrylate | 238.10 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 34.3 grams/hour over 2.5 hours. After 15 minutes Charge 3 was added to reactor at the addition rate 952.2 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. The final solids of the resulting polymer solution was determined to be 76.24% determined at 110° C. for one hour. The copolymer had $M_n=1150$ and $M_w/M_n=2.0$. The $^{13}C$ NMR spectrum was consistent with a molar copolymer composition of 20% diisobutylene, 30% hydroxypropyl acrylate, 10% dimethylaminoethyl methacrylate, 10% ethyl acrylate, and 30% 2-ethylhexyl acrylate.

EXAMPLE 5-O-D

Preparation of an aqueous amine salt dispersion of copolymer diisobutylene/dimethylaminoethyl methacrylate-alt-hydroxypropyl acrylate/2-ethylhexyl acrylate/ethyl acrylate. The ingredients in Table 19 were used for to make the dispersion.

TABLE 19

| Ingredients | Parts by weight (grams) |
| --- | --- |
| Deionized water | 986.9 |
| DMPB | 63.7 |
| Diisobutylene/Dimethylaminoethyl methacrylate-alt-Hydroxyethyl acrylate/2-Ethylhexyl acrylate/Ethyl acrylate (Example 5-O) | 983.7 |
| Deionized water | 628.0 |

The ingredients were added sequentially to a suitable vessel under mild agitation. The final solids were 30.68%.

EXAMPLE 6-Q

Synthesis of copolymer diisobutylene-alt-hydroxypropyl acrylate/butyl acrylate. The ingredients in Table 20 were used for the polymerization.

TABLE 20

| Ingredients | Parts by weight (grams) |
| --- | --- |
| Charge 1 | Diisobutylene | 300.00 |
| Charge 2 | Di-t-amyl Peroxide | 90.00 |
| Charge 3 | Hydroxypropyl Acrylate | 855.00 |
| | Butyl Acrylate | 1995.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36 grams/hour over 2.5 hours. After 15 minutes charge 3 was added to reactor at an addition rate of 1425 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of the reaction mixture showed that all acrylates were reacted. The final solids of the resulting polymer was determined to be 96.60% at 110° C. for one hour. The copolymer had $M_n=4090$ and $M_w/M_n=2.3$. The $^{13}C$ NMR spectrum was consistent with a molar copolymer composition of 8.3% diisobutylene, 27.5% hydroxypropyl acrylate, and 64.2% butyl acrylate.

EXAMPLE 6-R

Synthesis of copolymer diisobutylene-alt-hydroxypropyl acrylate/butyl acrylate. The ingredients in Table 21 were used for the polymerization.

TABLE 21

| Ingredients | Parts by weight (grams) |
| --- | --- |
| Charge 1 | Diisobutylene | 310.00 |
| Charge 2 | Di-t-amyl Peroxide | 45.00 |
| Charge 3 | Hydroxypropyl Acrylate | 382.50 |
| | Butyl Acrylate | 892.5 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18 grams/hour over 2.5 hours. After 15 minutes charge 3 was added to reactor at the addition rate 637.5 grams/hour over 2 hours. During the monomer addition the temperature was maintained at 150° C. at 40 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 92.60% at 110° C. for one hour. The copolymer had $M_n=2280$ and $M_w/M_n=1.9$. The $^{13}C$ NMR spectrum was consistent with a molar copolymer composition of 15.6% diisobutylene, 25.3% hydroxypropyl acrylate, and 59.1% butyl acrylate.

EXAMPLE 6-S

Synthesis of copolymer diisobutylene-alt-hydroxypropyl acrylate/butyl acrylate. The ingredients in Table 22 were used for the polymerization.

TABLE 22

| | Ingredients | Parts by weight (grams) |
|---|---|---|
| Charge 1 | Diisobutylene | 450.00 |
| Charge 2 | Di-t-amyl Peroxide | 45.00 |
| Charge 3 | Hydroxypropyl Acrylate | 382.50 |
| | Butyl Acrylate | 892.50 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 18 grams/hour over 2.5 hours. After 15 minutes charge 3 was added to reactor at an addition rate of 637.5 grams/hour over 2 hours. During the monomer addition the temperature was maintained at 150° C. at 40 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 89.41% at 110° C. for one hour. The copolymer had $M_n=2000$ and $M_w/M_n=1.8$. The $^{13}C$ NMR spectrum was consistent with a molar copolymer composition of 21.76% diisobutylene, 23.47% hydroxypropyl acrylate, and 54.77% butyl acrylate.

EXAMPLE 6-T

Synthesis of copolymer diisobutylene-alt-hydroxypropyl acrylate/butyl acrylate. The ingredients in Table 23 were used for the polymerization.

TABLE 23

| | Ingredients | Parts by weight (grams) |
|---|---|---|
| Charge 1 | Diisobutylene | 750.00 |
| Charge 2 | Di-t-amyl Peroxide | 45.00 |
| Charge 3 | Hydroxypropyl Acrylate | 337.50 |
| | Butyl Acrylate | 787.50 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18 grams/hour over 2.5 hours. After 15 minutes Charge 3 was added to reactor at the addition rate 562.5 grams/hour over 2 hours. During the monomer addition the temperature was maintained at 150° C. at 55 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 79.48% at 110° C. for one hour. The copolymer had $M_n=1180$ and $M_w/M_n=1.7$. The $^{13}C$ NMR spectrum was consistent with a molar copolymer composition of 26.30% diisobutylene, 22.10% hydroxypropyl acrylate, and 51.60% butyl acrylate.

EXAMPLE 7-U

Synthesis of copolymer diisobutylene-alt-hydroxpropyl acrylate/butyl acrylate/acrylic acid. The ingredients in Table 24 were used for the polymerization.

TABLE 24

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 785.60 |
| | Butyl Acrylate | 1207.20 |
| | Acrylic Acid | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.67% at 110° C. for one hour. The copolymer had $M_n=1770$ and $M_w/M_n=2.4$. The $^{13}C$ NMR spectrum was consistent with a molar copolymer composition of 20% diisobutylene, 30% hydroxypropyl acrylate, 2% acrylic acid, and 48% butyl acrylate.

EXAMPLE 7-V

Synthesis of copolymer diisobutylene-alt-hydroxypropyl acrylate/butyl acrylate/acrylonitrile. The ingredients in Table 25 were used for the polymerization.

TABLE 25

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 785.60 |
| | Butyl Acrylate | 1207.20 |
| | Acrylonitrile | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.92% at 110° C. for one hour. The copolymer had $M_n=1940$ and $M_w/M_n=2.3$. The $^{13}C$ NMR spectrum was consistent with a molar copolymer composition of 20% diisobutylene, 30% hydroxypropyl acrylate, 2% acrylonitrile, and 48% butyl acrylate.

EXAMPLE 7-W

Synthesis of copolymer diisobutylene-alt-hydroxypropyl acrylate/butyl acrylate/hydroxyethyl acrylate. The ingredients in Table 26 were used for the polymerization.

TABLE 26

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 392.80 |
| | Hydroxyethyl Acrylate | 392.80 |
| | Butyl acrylate | 1207.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 996.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 81.17% determined at 110° C. for one hour. The copolymer had $M_n$=1700 and $M_w/M_n$=2.4. The $^{13}C$ NMR spectrum was consistent with a copolymer composition of 20% diisobutylene, 15% hydroxypropyl acrylate, 15% hydroxyethyl acrylate, and 50% butyl acrylate.

EXAMPLE 7-X

Synthesis of copolymer diisobutylene/styrene-alt-hydroxpropyl acrylate/butyl acrylate/isobornyl acrylate. The ingredients in Table 27 were used for the polymerization.

TABLE 27

| | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 900.00 |
| | Isobornyl Acrylate | 400.00 |
| | Butyl acrylate | 500.00 |
| | Styrene | 200.00 |

Charge 1 was added to a 4-liter stirred stainless steel pressure reactor. The reactor was pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over a 2.5 hour period. After 15 minutes Charge 3 was added to reactor at an addition rate of 1000 grams/hour over a 2 hour period. During the monomer addition the temperature was maintained at 150° C. and 60 PSI. After Charges 2 and 3 were in the reactor, the reaction mixture was held for 2 hours. The reactor was than cooled to 25° C. GC analysis of the reaction mixture showed that all acrylates and styrene were reacted. The final solids of the resulting polymer was 83.12% determined at 110° C. for one hour. The copolymer had $M_n$=1400 and $M_w/M_n$=2.4. The $^{13}C$ NMR spectrum was consistent with a molar copolymer composition of 22.1% diisobutylene, 35.0% hydroxypropyl acrylate, 15.6% isobornyl acrylate, 7.8% styrene, and 19.5% butyl acrylate.

EXAMPLE 7-Y

Synthesis of alternating copolymer diisobutylene-alt-hydroxypropyl acrylate/Butyl acrylate/N-butoxymethyl acrylamide. The ingredients in Table 28 were used in polymerization technique.

TABLE 28

| | Ingredients | Parts by weight (grams) |
|---|---|---|
| Charge 1 | Diisobutylene | 100.00 |
| Charge 2 | t-Amylperoxy(2-ethyl hexanoate) | 12 |
| Charge 3 | N-butoxymethyl acryamide (50% solution in butanol) | 10.00 |
| | Hydroxypropyl Acrylate | 78.50 |
| | Butyl Acrylate | 120.70 |

Charge 1 was added to a reaction flask equipped with an agitator, a thermocouple, and a $N_2$ inlet, placed under a blanket of $N_2$, and heated to 103° C. Charge 2 was added to the reactor over a 2.5 hour period. After 15 minutes Charge 3 was added to the reactor over a 2 hour period. During the monomer addition the temperature was maintained at 103° C. After Charges 2 and 3 were in the reactor, the reaction mixture was held for 2 hours. The reactor was then cooled to 25° C. GC analysis of the reaction mixture showed that all acrylates and acrylamide were reacted. The reaction flask was then equipped for simple vacuum distillation and the reaction mixture heated to 80° C. to remove the unreacted diisobutylene. The reaction mixture was cooled to 40° C. and 40 grams of Dowanol PM was added to the reaction mixture. The solids of the resulting polymer was 91% (in butyl alcohol) determined at 110° C. for one hour. The copolymer had $M_n$=4420 and $M_w/M_n$=3.4. The $^{13}C$ NMR spectrum was consistent with a molar copolymer composition of 28% Diisobutylene, 28% Hydroxypropyl acrylate, 2% N-butoxymethyl acryamide, and 42% Butyl acrylate.

EXAMPLE 7-Z

Synthesis of alternating copolymer diisobutylene-alt-hydroxypropyl acrylate/butyl acrylate/poly(ethylene glycol) methyl ether acrylate. The ingredients in Table 29 were used in the polymerization technique.

TABLE 29

| | Ingredients | Parts by weight (grams) |
|---|---|---|
| Charge 1 | Diisobutylene | 100.00 |
| Charge 2 | t-Amylperoxy(2-ethyl hexanoate) | 12 |
| Charge 3 | Poly(ethylene glycol) methyl ether acrylate | 5.00 |
| | Hydroxypropyl Acrylate | 78.50 |
| | Butyl Acrylate | 120.70 |

Charge 1 was added to a reaction flask equipped with an agitator, a thermocouple, and a $N_2$ inlet, placed under a blanket of $N_2$, and heated to 103° C. Charge 2 was added to the reactor over a 2.5 hour period. After 15 minutes Charge 3 was added to the reactor over a 2 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The solids of the resulting polymer were 78.4% determined at 110° C. for one hour. The copolymer had $M_n$=5230 and $M_w/M_n$=1.9. The $^{13}$C NMR spectrum was consistent with a molar copolymer composition of 26% diisobutylene, 25% hydroxypropyl acrylate, 2% poly(ethlene glycol) methyl ether acrylate, and 47% butyl acrylate.

EXAMPLE 8-AA

Synthesis of alternating copolymer diisobutylene-alt-methyl acrylate/butyl acrylate. The ingredients in Table 30 were used in the polymerization technique.

TABLE 30

| | Ingredients | Parts by weight (grams) |
|---|---|---|
| Charge 1 | Diisobutylene | 336.00 |
| Charge 2 | t-Amylperoxy(2-ethyl hexanoate) | 12 |
| Charge 3 | Methyl acrylate | 21.50 |
| | Butyl Acrylate | 128.00 |

Charge 1 was added to a reaction flask equipped with an agitator, a thermocouple, and a $N_2$ inlet, placed under a blanket of $N_2$, and heated to 103° C. Charge 2 was added to the reactor over a 4.5 hour period. After 15 minutes Charge 3 was added to the reactor over a 4 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The reaction flask was then equipped for simple vacuum distillation and the reaction mixture heated to 80° C. to remove the unreacted diisobutylene. The reaction mixture was cooled to 40° C. and 60 grams of Dowanol PM was added. The solids of the resulting polymer were 75.6% determined at 110° C. for one hour. The copolymer had $M_n$=1530 and $M_w/M_0$=3.2. The $^{13}$C NMR spectrum was consistent with a molar copolymer composition of 39.4% diisobutylene, 11.5% methyl acrylate and 49.1% butyl acrylate.

EXAMPLE 8-BB

Synthesis of alternating copolymer diisobutylene-alt-isobornyl acrylate/butyl acrylate. The ingredients in Table 31 were used in the polymerization technique.

TABLE 31

| | Ingredients | Parts by weight (grams) |
|---|---|---|
| Charge 1 | Diisobutylene | 224.00 |
| Charge 2 | t-Amylperoxy(2-ethyl hexanoate) | 12 |
| Charge 3 | Isobornyl acrylate | 104.2 |
| | Butyl Acrylate | 64.1 |

Charge 1 was added to a reaction flask equipped with an agitator, a thermocouple, and a N2 inlet, placed under a blanket of N2, and heated to 103° C. Charge 2 was added to the reactor over a 3.5 hour period. After 15 minutes Charge 3 was added to the reactor over a 3 hour period. During the monomer addition the temperature was maintained at 103° C. After Charges 2 and 3 were in the reactor, the reaction mixture was held for 2 hours. The reactor was then cooled to 25° C. GC analysis of the reaction mixture showed that all acrylates were reacted. The reaction flask was then equipped for simple vacuum distillation, the reaction mixture was heated to 80° C. to remove the unreacted diisobutylene. The reaction mixture was cooled to 40° C. and 60 grams of Dowanol PM was added. The solids of the resulting polymer were 72.9% determined at 110° C. for one hour. The copolymer had Mn=1880 and Mw/Mn=2.0. The $^{13}$C NMR spectrum was consistent with a molar copolymer composition of 31.8% Diisobutylene, 35.5% Isobornyl acrylate and 32.7% Butyl acrylate.

EXAMPLE 8-CC

Synthesis of alternating copolymer diisobutylene-alt-acrylic acid. The ingredients in Table 32 were used in the polymerization technique.

TABLE 32

| | Ingredients | Parts by weight (grams) |
|---|---|---|
| Charge 1 | Dowanol PM | 500.00 |
| | Diisobutylene | 896.00 |
| Charge 2 | t-Amylperoxy(2-ethyl hexanoate) | 24 |
| Charge 3 | Acrylic acid | 400.00 |

Charge 1 was added a reaction flask equipped with an agitator, a thermocouple, and a N2 inlet, placed under a blanket of N2, and heated to 103° C. Charge 2 was added to the reactor over a 3.5 hour period. After 15 minutes Charge 3 was added to the reactor over a 3 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that the acrylic acid was completely reacted. The reaction flask was than equipped for simple vacuum distillation and the reaction mixture heated to 80° C. to remove unreacted diisobutylene and solvent. The solids of the resulting polymer were 99.1% determined at 110° C. for one hour. The copolymer had Mn=1860 and Mw/Mn=2.4. The $^{13}$C NMR spectrum was consistent with a molar copolymer composition of 40% Diisobutylene and 60% Acrylic acid.

EXAMPLE 8-DD

This example describes the preparation of a sulfonium functional diisobutylene/acrylic resin prepared from a diisobutylene/styrene/glycidyl acrylate/hydroxypropyl acrylate alternating copolymer. The starting copolymer was prepared as described below from the ingredients in Table 33:

TABLE 33

| Ingredients | Parts by weight (grams) |
|---|---|
| Diisobutylene | 1000 |
| n-Methoxypropanol[1] | 700 |
| Styrene | 330 |
| Glycidyl acrylate | 120 |
| Hydroxypropyl acrylate | 150 |
| t-Amyl peroxy-2-ethylhexanoate | 34 |
| t-Amyl peroxy-2-ethylhexanoate | 8 |
| t-Amyl peroxy-2-ethylhexanoate | 12 |

[1]DOWANOL ® PM solvent, Dow Chemical Co., Midland MI

The diisobutylene and n-methoxypropanol were charged to a reaction vessel capable of holding pressure consistent with the reaction conditions. This mixture was then heated to reflux, approximately 100° C. A mixture of styrene, glycidyl acrylate, and hydroxypropyl acrylate was added over a period of 3 hours. At the same time, the first charge of t-amyl peroxy-2-ethylhexanoate was added over 3 hours. After the additions the copolymer was held for 2 hours at reflux. A sample for solids was used to determine whether the reaction was complete. After the hold period, 8 grams of t-amyl peroxy-2-ethylhexanoate was added, and the reaction held for 8 hours. A second addition of 12 grams t-amyl peroxy-2-ethylhexanoate followed, and the reaction held an additional 5 hours at reflux. At that point, the reaction had reached the theoretical non-volatile content of 47.3%. The unreacted diisobutylene was then removed under vacuum at 90–95° C. The final product was filtered through a 5 micron bag.

A sulfonium functional diisobutylene/acrylic resin was prepared from the starting copolymer of Table 33 as described below from the ingredients in Table 34.

TABLE 34

| Ingredients | Parts by Weight (in grams) |
| --- | --- |
| Acrylic-diisobutylene polymer of Table 33 | 1310.0 |
| Thiodiethanol | 366.0 |
| Lactic Acid | 81.8 |
| Urethane Crosslinker described above | 662.5 |
| Deionized Water | 54.0 |
| Deionized Water | 1784.2 |
| Deionized Water | 1353.5 |

The diisobutylene-acrylic polymer was charged to a reaction vessel and heated to 80° C. Thiodiethanol, the first charge of deionized water, and lactic acid were then added to the reaction vessel. The reaction mixture was then held at 80° C. for 5 hours. At this point, urethane crosslinker was added to the reactor. After mixing for 15 minutes, the resin was dispersed into the second charge of deionized water which was at 25° C. After mixing for 30 minutes, the dispersion was reduced to its final solids with the third charge of deionized water. The dispersion had a non-volatile content of 20.3%.

EXAMPLE 8-EE

This example describes the preparation of a sulfonium group-containing diisobutylene/acrylic resin from a diisobutylene/hydroxypropyl acrylate/glycidyl methacrylate/2-ethylhexyl acrylate alternating co-polymer using di-tert-amyl peroxide as an initiator. The starting copolymer was prepared as described below from the ingredients in Table 35.

TABLE 35

| Ingredients | Parts by weight (grams) |
| --- | --- |
| Diisobutylene | 1000 |
| Di-tert-Amyl Peroxide | 45 |
| Hydroxypropyl Acrylate | 300 |
| Glycidyl Methacrylate | 300 |
| 2-Ethylhexyl Acrylate | 1400 |

The diisobutylene was charged to a reaction vessel capable of holding pressure consistent with the reaction conditions. The diisobutylene was heated to 150° C. The di-tert-amyl peroxide was added over 2.5 hours. 15 Minutes after starting the di-tert-amyl peroxide addition, the hydroxypropyl acrylate, glycidyl methacrylate, and 2-ethylhexyl acrylate, previously combined and mixed, was added over 2.0 hours. After the additions were complete the copolymer was held at 150° C. for 2.0 hours then cooled to ambient temperature. The polymer was found to have an epoxy equivalent weight of 1650. Percent non-volatile was measured to 75% with residual non-volatiles consisting of diisobutylene and decomposition products from the initiator. The sulfonium functional resin was prepared as described below from the ingredients in Table 36.

TABLE 36

| Ingredients | Parts by Weight (grams) |
| --- | --- |
| Starting copolymer of Table 35 | 771.5 |
| Thiodiethanol | 122.0 |
| Deionized Water | 27.0 |
| Lactic Acid | 40.9 |
| Deionized Water | 884.5 |
| Deionized Water | 572.2 |

The diisobutylene-acrylic copolymer of Table 35 was charged to a reaction vessel and heated to 80° C. Thiodiethanol, the first charge of deionized water, and lactic acid were then added to the reaction vessel. The reaction mixture was then held at 80° C. After five hours, an acid value of 6.5 and a sulfonium level of 0.185 meq/g were obtained. At this point the resin was dispersed with agitation into the second charge of deionized water which was at 25° C. After mixing for 30 minutes the dispersion was reduced to the proper solids with the final charge of deionized water. The dispersion had a non-volatile content of 25%.

EXAMPLE 9

This example set describes the preparation of electrodepositable coating compositions in the form of electrodeposition baths. The electrodepositable coating compositions were prepared as described below using the ingredients in Table 37.

TABLE 37

| | Parts by weight (grams) | | |
| --- | --- | --- | --- |
| Ingredient | Example 9 (Comparative) | Example 9N | Example 9O |
| E8003[1] | 817.0 | 735.3 | 735.3 |
| Amine salt dispersion of Example 5-N-D | | 128.8 | |
| Amine salt dispersion of Example 5-O-D | | | 108.5 |
| E8008[2] | 230.7 | 230.7 | 230.7 |
| Deionized water | 2752.4 | 2725.6 | 2725.6 |

[1]A cationic polyurethane resin available from PPG Industries, Inc.
[2]A pigment paste available from PPG Industries, Inc.

The E8003 cationic polyurethane was combined with 500.0 grams of the deionized water and stirred thoroughly. The cationic additives of Examples N and O were combined with 300.0 grams of the deionized water and stirred. This solution was then added to the reduced cationic polyurethane. Finally, the E8008 pigment paste was reduced with the remaining amount of deionized water, then added to the resin mixture under agitation.

The electrodepositable coating compositions were evaluated for oil-spot resistance. The purpose of this procedure is to measure a coatings resistance to visible defects such as craters, caused by surface oil contamination. The substrate used in this procedure was 4"×12" zinc phosphated cold rolled steel panels available as APR 28630 from ACT Laboratories, Inc., Hillsdale, Mich. The substrate was first electrocoated using ED7951 (a conductive black coating available from PPG Industries, Inc.) applied@0.75 mil. This first coat was cured for 25 minutes at 375° F. Three conveyor oils were used to test the oil-spot resistance of the electrodepositable coatings:

1. Moluballoy ICO Oil (ICO) chain oil from TRIBOL CORP., Sterling Heights, Mich.
2. Lubercon Series I (LUB) chain oil from LUBERCON MAINTENANCE, Fremont, Mich.
3. P80–a light transportation oil from Germany.

Prior to preparing the panels, the bath compositions were warmed to the coat out temperature of 90° F. The panel to be tested was placed on the bench, laying a divider on the panel, which divides the panel surface into three sections protected from one another. A toothbrush was dipped into the ICO oil, excess oil blotted off with a paper towel, and the oil gently flicked over the top section of the panel to give a spattered pattern of small droplets. The LUB oil was applied in a similar manner onto the middle section, and the P80 light transportation oil was applied to the bottom third of the panel. A separate toothbrush was used for each oil. The prepared panel was then placed immediately into the bath composition being tested and the electrodepositable composition was applied. Electrodeposition was carried out at 180 volts for 135 seconds. The test panels were cured for 30 minutes at 350° F. These conditions yielded approximately 1.4 mils of cured film. The panels were then visually inspected for defects and rated versus the comparative example (comparative rating 0). Results are shown in Table 38.

TABLE 38

| Bath | ICO | LUB | P80 |
| --- | --- | --- | --- |
| Example 9 Comparative | 0 | 0 | 0 |
| Example 9-N | ++ | ++ | ++ |
| Example 9-O | ++ | ++ | ++ |

These examples demonstrate the use the alternating copolymers of the present invention in an electrodeposition coating composition.

EXAMPLE 10

This example demonstrates resistance to surface contamination when isobutylene type copolymers made using the present method are used in a thermoset clearcoat composition.

A commercial, solvent-borne, thermoset clearcoat (OFDCT 8000, available from PPG Industries) was treated with 3% of the polymer of example 8-AA. The polymer was incorporated by thorough mixing into a sample of commercially produced clear coat.

Commercially available electrocoated 4"×12" steel panels were spot contaminated with 0.1 to 0.2 microgram quantities of a series of polymers with varying surface tension. The two samples of the treated and one untreated clear coats were spray applied onto identically spot contaminated test panels. The clearcoat was applied in two coats with a sixty second flash in between, flashed for 10 minutes at ambient conditions and baked for 30 minutes at 285° F. The dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

|  | Rating |
| --- | --- |
| OFDCT 8000 untreated | 57 |
| FDCT 8000 + 3% additive | 89 |

Recoat adhesion was equal for the treated and untreated clear coats.

EXAMPLE 11

This example demonstrates resistance to surface contamination when isobutylene type copolymers made using the present method are used in a thermoset clearcoat composition.

A commercial, solvent-borne, thermoset clearcoat (DC5001, available from PPG Industries) was treated with 3% of the polymer of example 8-BB. The polymer was incorporated by thorough mixing into a sample of commercially produced clear coat.

Commercially available electrocoated 4"×12" steel panels were spot contaminated with 0.1 to 0.2 microgram quantities of a series of polymers with varying surface tension. Two treated and one untreated clear coats were spray applied onto identically spot contaminated test panels. The clearcoat was applied in two coats with a sixty second flash in between, flashed for 10 minutes at ambient and baked for 30 minutes at 285° F. Dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

|  | Rating |
| --- | --- |
| DC5001 untreated | 58 |
| DC5001 + 3% additive | 72 |

Recoat adhesion was equal for the treated and untreated clear coats.

EXAMPLE 12

This example demonstrates the use of isobutylene type copolymers made by the current method in a powder coating formulation, which is a grindable solid that forms a cured film when baked. The powder coating composition was prepared using the ingredients shown in Table 39.

TABLE 39

| Materials | Example V (g) |
| --- | --- |
| Polymer of example 8-CC | 7.0 |
| Hydroxy alkylamide[32] | 4.7 |
| Degasser[33] | 0.1 |
| Flow Agent[34] | 0.1 |

[32]Primid QM-1260, EMS Primid, Sumpter, S.C.
[33]Benzoin, Ura Flow B, Estron Chemical, Calvert City, KY.
[34]Resiflow PL-200, Monsanto.

Each component was mixed sequentially in a container. The mixture was then poured onto a heated 175° C. hot plate and stirred with a spatula until fluid. The mixture was then placed into a container and allowed to cool. Once cooled, it was ground into a fine powder using a mortar and pestle. The test substrate was ACT cold roll steel panels, 10.16 cm×30.48 cm (4"×12") available as APR10433 from ACT Laboratories, Inc., Hillsdale, Mich. The powder coating was dusted onto the surface of the steel panel which was placed on the 175° C. hot plate. As the powder began to flow, a straight edge was used to draw down the coating to cover the surface of the panel. The panel was then place into a 375° F. oven for 30 minutes and cured.

Gel point determination was measured on the powder coating as it was heated on the surface of a 175° C. hot plate. Time is measured from the point when the powder melts to the point it gels, i.e., forms a solid. The time is measured in minutes and seconds. When a powder starts to cure, it will begin to string. The flat part of the tongue depressor is pushed into the molten powder and pulled upward, roughly every 15 seconds until the melt no longer strings and the timer is stopped. This is the gel point determination. A shorter period of time to reach a gel point is preferred.

Methyl ethyl ketone (MEK) rub solvent resistance was used to determine the cure of the paint. Cheesecloth was moistened with MEK and, with moderate pressure, at a rate of about 1 double rub per second, rubbed over the painted panel until the coating becomes damaged. This test is typically run to 100 double rubs or failure of the coating, which ever occurs first. The higher the number of rubs, the better the cure of the coating. Table 40 shows the test results.

TABLE 40

| | Example V |
| --- | --- |
| Gel Point | 30 Seconds |
| Mek double rubs | >100 |

The results demonstrate the good results achieved when the present isobutylene type copolymers are used in a powder coating formulation.

EXAMPLE 13

This example demonstrates the generally poor results observed when poly(isobutylene—alt maleic acid) type polymers are formulated into a clearcoat system. The maleic acid polymer was prepared using the ingredients shown in Table 41.

TABLE 41

| | Ingredients | Parts by weight (grams) |
| --- | --- | --- |
| Charge 1 | Poly(isobutylene-alt-maleic anhydride)[35] | 200.00 |
| Charge 2 | M-pyrol | 400.00 |
| Charge 3 | DiH2O | 54.00 |

[34]Mw ca. 60.000, Aldrich Chemical Company, Milwaukee, WI

Charges 1 and 2 were mixed until completely dissolved. Then Charge 3 was added and the mixture heated to 90° C. and held for 7 hours. The reactor was then cooled to 25° C. The solids of the resulting polymer were 45.6% determined at 110° C. for one hour. The resin had an acid value of 115.35.

A clearcoat was formulated by sequentially mixing each component in Table 42 with agitation.

TABLE 42

| Materials | Example X | Example Y |
| --- | --- | --- |
| Methyl N-Amyl Ketone | 25 | |
| Butyl Ether Diethylene Glycol Acetate | 5.0 | |
| N-Amyl Alcohol | 4.1 | |
| Methanol | | 32.0 |
| GMA Acrylic Resin[35] | 87.89 | 86.1 |
| Acid Functional Crosslinker[36] | 63.69 | |
| Poly(isobutylene-alt maleic acid) | | 97.84 |

[35]50% glycidyl methacrylate, 0.2% methyl methacrylate, 7% styrene, 2.0% diphenyl-2, 4; methyl-4; pentene-1, 40.8% n-butyl methacrylate, 66% solids in 8/74/18 w/w odorless mineral spirits/Aromatic 100/methyl ether propylene glycol acetate.
[36]83/17 w/w methylhexahydrophthalic anhydride/pentaerythritol, 68% solids in 51/49 w/w n-propanol/n-amyl propionate.

The test substrate was ACT cold roll steel panels 10.16 cm×30.48 cm (4"×12") available as APR28215 from ACT Laboratories, Inc., Hillsdale, Mich. The clear coating compositions of examples X and Y were applied to the panels at ambient temperature using an 8-path Wet Film Applicator, #14 available from Paul N. Gardner Company, Inc. Dry film thickness was targeted for about 30 micrometers, 1.6 mils. Panels prepared from each coating were baked for 30 minutes at 141° C.

MEK rub solvent resistance, as described in example 18 was used to evaluate the cure of the paint. The results are shown in Table 43.

TABLE 43

| | Comparative X | Example Y |
| --- | --- | --- |
| Mek Double Rubs | 20 | 1 |

The results show the generally inferior results that are found when a difunctional acid acceptor monomer, such as maleic acid is used as a comonomer with isobutylene type acceptor monomers and formulated into a clearcoat system.

The present invention has been described with reference to specific details of particular embodiments thereof. It is not intended that such details be regarded as limitations upon the scope of the invention except insofar as and to the extent that they are included in the accompanying claims.

We claim:

1. A method of making a copolymer composition containing alternating donor-acceptor segments comprising the steps of:

(a) providing a donor monomer composition comprising one or more monomers having the following structure (I):

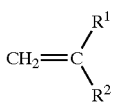  (I)

wherein $R^1$ is linear or branched $C_1$ to $C_4$ alkyl and $R^2$ is selected from the group consisting of methyl, linear, cyclic or branched $C_1$ to $C_{20}$ alkyl, alkenyl, aryl, alkaryl and aralkyl;

(b) mixing the donor monomer composition with an ethylenically unsaturated monomer composition comprising one or more ethylenically unsaturated acceptor monomers, forming a total monomer composition substantially free of maleate type monomers and fumarate type monomers; and (c) polymerizing the mixture resulting from step (b) in the presence of a free radical polymerization initiator in the substantial absence of Lewis acids and transition metals;

wherein the monomer of structure (I) is present at a molar excess based on the molar concentration of monomers in the ethylenically unsaturated monomer composition; and the ethylenically unsaturated acceptor monomers are present in an amount of at least 15 mol % of the total monomer composition.

2. The method of claim 1 wherein the donor monomer composition comprises one or more selected from the group consisting of styrene, substituted styrenes, methyl styrene, substituted methyl styrenes, vinyl ethers and vinyl pyridine.

3. The method of claim 1 wherein the donor monomer of structure (I) is selected from the group consisting of isobutylene, diisobutylene, dipentene, isoprenol and mixtures thereof.

4. The method of claim 1 wherein the group $R^2$ of the donor monomer of structure (I) includes one or more functional groups selected from the group consisting of hydroxy, epoxy, carboxylic acid, ether, and amide.

5. The method of claim 1 wherein the ethylenically unsaturated acceptor monomer composition comprises acrylonitrile.

6. The method of claim 1 wherein the ethylenically unsaturated acceptor monomer is an acrylic acceptor monomer comprised of one or more monomers described by structure (III):

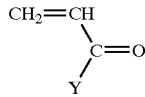  (III)

wherein Y is selected from the group consisting of —$NR^3_2$, —O—$R^5$—O—C(=O)—$NR^3_2$ and —$OR^4$, $R^3$ is selected form the group consisting of H, linear or branched $C_1$ to $C_{20}$ alkyl and linear or branched $C_1$ to $C_{20}$ alkylol, $R^4$ is selected form the group consisting of H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane, a polysiloxane, an alkyl siloxane, an ethoxylated trimethylsilyl siloxane and a propoxylated trimethylsilyl siloxane and $R^5$ is a divalent linear or branched $C_1$ to $C_{20}$ alkyl linking group.

7. The method of claim 6 wherein Y includes at least one functional group of one or more selected from the group consisting of epoxy, carboxylic acid, hydroxy, amide, ether, ester, isocyanate, amine, thioether and sulfide.

8. The method of claim 1 wherein the monomer of structure (I) is present at a molar excess of at least 10 mol % based on the total monomer composition.

9. The method of claim 1 wherein the resulting copolymer is reacted such that one or more functional groups are incorporated into the copolymer.

10. The method of claim 9 wherein the functional groups incorporated into the copolymer are one or more selected from the group consisting of epoxy, carboxylic acid, hydroxy, amide, oxazoline, aceto acetate, isocyanate, carbamate, amine, amine salt, quaternized amine, thioether, sulfide, sulfonium salt and phosphate.

11. The method of claim 1 wherein the free radical initiator is a thermal free radical initiator.

12. The method of claim 11 wherein the thermal free radical initiator is selected from the group consisting of a peroxide compound, an azo compound and a persulfate compound.

13. The method of claim 11 wherein the peroxide compound is one or more selected from the group consisting of hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides and peroxyketals.

14. The method of claim 11 wherein the azo compound is one or more selected from the group consisting of 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and 2-(carbamoylazo)-isobutyronitrile.

15. The method of claim 1 wherein the ethylenically unsaturated acceptor monomer is an acrylic acceptor monomer and is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate and n-butoxy methyl acrylamide.

16. The method of claim 1 wherein the ethylenically unsaturated monomer composition and the free radical polymerization initiator are separately and simultaneously added to the donor monomer composition over a period of time of from 30 minutes to 12 hours.

17. The method of claim 1 wherein after the polymerization in (c), any unreacted monomer of structure (I) is substantially removed from the resulting copolymer composition by evaporation.

18. The method of claim 17 wherein the removal of unreacted monomer is facilitated by the application of a vacuum.

19. The method of claim 1 wherein the mixing step (b) includes mixing into the total monomer composition one or more residues derived from other ethylenically unsaturated monomers of general structure (IV):

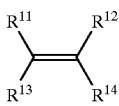

(IV)

wherein $R^{11}$, $R^{12}$ and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^{13}$ is selected from the group consisting of H, $C_1$–$C_6$ alkyl, $COOR^{15}$ wherein $R^{15}$ is selected from the group consisting of H, an alkali metal, a $C_1$ to $C_6$ alkyl group, glycidyl and aryl.

20. The method of claim 12 wherein the other ethylenically unsaturated monomers are one or more selected from the group consisting of methacrylic monomers and allylic monomers.

21. A method of making a copolymer composition containing alternating donor-acceptor segments comprising the steps of:
(a) providing a donor monomer composition comprising monomers selected from the group consisting of isobutylene, diisobutylene, dipentene, isoprenol and mixtures thereof;
(b) mixing the donor monomer composition with an ethylenically unsaturated monomer composition comprising one or more acrylic acceptor monomers to form a total monomer composition substantially free of maleate type monomers and, fumarate type monomers; and
(c) polymerizing the monomer mixture resulting from step (b) in the presence of a free radical polymerization initiator in the substantial absence of Lewis acids and transition metals;
wherein the donor monomer composition is present at a molar excess of at least 10 mol % based on the molar concentration of acrylic acceptor monomer, and the acrylic acceptor monomer is present in an amount of at least 15 mol % of the total monomer composition.

22. The method of claim 21 wherein the donor monomer composition comprises one or more selected from the group consisting of styrene, substituted styrenes, methyl styrene, substituted methyl styrenes, vinyl ethers and vinyl pyridine.

23. The method of claim 21 wherein the ethylenically unsaturated monomer composition comprises acrylonitrile.

24. The method of claim 21 wherein the acrylic acceptor monomer is one or more described by structure (III):

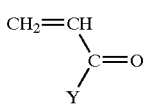

(III)

wherein Y is selected from the group consisting of —$NR^3_2$, —O—$R^5$—O—C(=O)—$NR^3_2$ and —$OR^4$, $R^3$ is selected form the group consisting of H, linear or branched $C_1$ to $C_{20}$ alkyl and linear or branched $C_1$ to $C_{20}$ alkylol, $R^4$ is selected from the group consisting of H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane, a polysiloxane, an alkyl siloxane, an ethoxylated trimethylsilyl siloxane and a propoxylated trimethylsilyl siloxane and $R^5$ is a divalent linear or branched $C_1$ to $C_{20}$ alkyl linking group.

25. The method of claim 24 wherein Y includes at least one functional group of one or more selected from the group consisting of epoxy, carboxylic acid, hydroxy, amide, ether, ester, isocyanate, amine, thioether and sulfide.

26. The method of claim 21 wherein the donor monomer composition is present at a molar excess of at least 50% based on the molar amount of acrylic acceptor monomer.

27. The method of claim 21 wherein the free radical initiator is a thermal free radical initiator.

28. The method of claim 27 wherein the thermal free radical initiator is selected from the group consisting of a peroxide compound, an azo compound and a persulfate compound.

29. The method of claim 28 wherein the peroxide compound is one or more selected from the group consisting of hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides and peroxyketals.

30. The method of claim 28 wherein the azo compound is one or more selected from the group consisting of 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and 2-(carbamoylazo)-isobutyronitrile.

31. The method of claim 21 wherein the acrylic acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide chlorotrifluoro ethylene, glycidyl acrylate, 2-ethylhexyl acrylate and n-butoxy methyl acrylamide.

32. The method of claim 21 wherein the ethylenically unsaturated monomer composition and the free radical polymerization initiator are separately and simultaneously added to the donor monomer composition over a period of time of from 30 minutes to 12 hours.

33. The method of claim 21 wherein after the polymerization in (c), any unreacted donor monomer from (a) is substantially removed from the resulting copolymer composition by evaporation.

34. The method of claim 21 wherein the removal of unreacted donor monomer is facilitated by the application of a vacuum.

35. The method of claim 21 wherein the resulting copolymer is reacted such that one or more functional groups are incorporated into the copolymer.

36. The method of claim 35 wherein the functional groups incorporated into the copolymer are one or more selected from the group consisting of epoxy, carboxylic acid, hydroxy, amide, oxazoline, aceto acetate, isocyanate, carbamate, amine, amine salt, quaternized amine, thioether, sulfide, sulfonium salt and phosphate.

37. The method of claim 21 wherein the mixing step (b) includes mixing into the total monomer composition one or more residues derived from other ethylenically unsaturated monomers of general structure (IV):

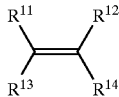

wherein $R^{11}$, $R^{12}$ and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^{13}$ is selected from the group consisting of H, $C_1$–$C_6$ alkyl, $COOR^{15}$ wherein $R^{15}$ is selected from the group consisting of H, an alkali metal, a $C_1$ to $C_6$ alkyl group, glycidyl and aryl.

38. A method of making a copolymer composition containing alternating donor-acceptor segments comprising the steps of:
(a) providing a donor monomer composition consisting essentially of one or monomers having the following structure (I):

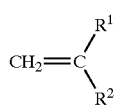

wherein $R^1$ is linear or branched $C_1$ to $C_4$ alkyl and $R^2$ is selected from the group consisting of methyl, linear, cyclic or branched $C_1$ to $C_{20}$ alkyl, alkenyl, aryl, alkaryl and aralkyl;
(b) mixing the donor monomer composition with an ethylenically unsaturated monomer composition consisting essentially of one or more acceptor monomers selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, 2-ethylhexyl acrylate, benzyl acrylate, alkyl benzyl acrylates, ethoxylated hydroxyethylacrylate, propoxylated hydroxyethylacrylate, ethoxylated hydroxypropyl acrylate, propoxylated hydroxypropylacrylate, perfluoroalkyl ethyl acrylates wherein the perfluoroalkyl group contains 4–20 carbon atoms, benzyl ether acrylates of a $C_9$–$C_{10}$ partially fluorinated alcohol, acrylate esters of a $C_9$–$C_{10}$ partially fluorinated alcohol, acryloxyalkyl terminated polydimethylsiloxanes, acryloxyalkyl tris(trimethylsiloxy silanes), acryloxyalkyl trimethylsiloxy terminated polyethylene oxide, epoxy functional acrylate esters, carboxylic acid functional acrylate esters, hydroxy functional acrylate esters, amide functional acrylate esters, oxazoline functional acrylate esters, aceto acetate functional acrylate esters, isocyanate functional acrylate esters, chlorotrifluoro ethylene, glycidyl acrylate, 2-ethylhexyl acrylate, n-butoxy methyl acrylamide and carbamate functional acrylate esters, to form a total monomer composition substantially free of maleate and fumarate type monomers; and
(c) polymerizing the mixture resulting from step (b) in the presence of a free radical polymerization initiator composition consisting essentially of one or more initiators selected from the group consisting of a peroxide compound, an azo compound and a persulfate compound, in the substantial absence of Lewis acids and transition metals;
wherein the donor monomer composition is present at a molar excess of at least 10% based on the molar concentration of monomers in the ethylenically unsaturated monomer composition, and the ethylenically unsaturated monomer composition is present in an amount of at least 15 mol % of the total monomer composition.

39. The method of claim 38 wherein the peroxide compound is one or more selected from the group consisting of hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides and peroxyketals.

40. The method of claim 38 wherein the azo compound is one or more selected from the group consisting of 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,41-azobis(4-cyanopentanoic acid), 2,2'-azobis(N,N'dimethyleneisobutyramidine), 2,2'-azobis(2-amidinopropane) dihydrochloride, 2,2'-azobis(N,N'-dimethyleneisobutyramidine) dihydrochloride and 2-(carbamoylazo)-isobutyronitrile.

41. The method of claim 38 wherein the ethylenically unsaturated monomer composition and the free radical polymerization initiator are separately and simultaneously added to the donor monomer composition over a period of time from 30 minutes to 12 hours.

42. The method of claim 38 wherein after the polymerization in (c), any unreacted monomer of structure (I) is substantially removed from the resulting copolymer composition by evaporation.

43. The method of claim 42 wherein the removal of unreacted monomer is facilitated by the application of a vacuum.

44. The method of claim 38 wherein the resulting copolymer is reacted such that one or more functional groups are incorporated into the copolymer.

45. The method of claim 44 wherein the functional groups incorporated into the copolymer are one or more selected from the group consisting of epoxy, carboxylic acid, hydroxy, amide, oxazoline, aceto acetate, isocyanate, carbamate, amine, amine salt, quaternized amine, thioether, sulfide, sulfonium salt and phosphate.

46. A copolymer prepared by the method of claim 1.
47. A copolymer prepared by the method of claim 21.
48. A copolymer prepared by the method of claim 38.

* * * * *

UNITED STATES PATENT AND TRADEMARK OFFICE
CERTIFICATE OF CORRECTION

PATENT NO.     : 6,677,422 B2                                          Page 1 of 1
DATED          : January 13, 2003
INVENTOR(S)    : Simion Coca et al.

It is certified that error appears in the above-identified patent and that said Letters Patent is hereby corrected as shown below:

<u>Column 40,</u>
Line 32, "4,41" should read -- 4,4' --.

Signed and Sealed this

Twenty-first Day of June, 2005

JON W. DUDAS
*Director of the United States Patent and Trademark Office*